United States Patent [19]

Yahiro

[11] Patent Number: 4,882,672

[45] Date of Patent: Nov. 21, 1989

[54] SYSTEM FOR INITIALIZATION OF CHANNEL CONTROLLERS UTILIZING ADDRESS POINTERS CALCULATED FROM MULTIPLYING SIZES OF DATA FIELDS WITH DEVICE NUMBERS

[75] Inventor: Kenji Yahiro, Tokyo, Japan

[73] Assignee: NEC Corporation, Tokyo, Japan

[21] Appl. No.: 338,380

[22] Filed: Apr. 13, 1989

Related U.S. Application Data

[63] Continuation of Ser. No. 99,719, Sep. 22, 1987, abandoned.

[30] Foreign Application Priority Data

Sep. 22, 1986 [JP]  Japan ................................. 61-224637

[51] Int. Cl.$^4$ ...................... G06F 13/12; G06F 9/34; G06F 12/00; G06F 12/10
[52] U.S. Cl. ............................... 364/200; 364/238.3; 364/256.3; 364/256.5; 364/258; 364/258.4
[58] Field of Search ..................... 364/200, 900, 300

[56] References Cited

U.S. PATENT DOCUMENTS

| 4,418,382 | 11/1983 | Larson et al. ........................ 364/200 |
| 4,459,661 | 7/1984 | Kaneda et al. ....................... 364/200 |
| 4,737,906 | 4/1988 | Edwards .............................. 364/200 |
| 4,742,447 | 5/1988 | Duvall et al. ........................ 364/200 |
| 4,779,189 | 10/1988 | Legvold et al. ..................... 364/200 |

*Primary Examiner*—Archie E. Williams, Jr.
*Assistant Examiner*—Robert P. Harrell
*Attorney, Agent, or Firm*—Foley & Lardner, Schwartz, Jeffery, Schwaab, Mack, Blumenthal & Evans

[57] ABSTRACT

A system for initializing a set of channel controllers in an information processing system reduces the time of initialization, the number of steps used in a microprogram, and necessary hardware. Address pointers of a plurality of control data areas relating to one of the channel controllers are utilized. Initialization data is sequentially read from a main memory of the information processing system. Address pointers of a channel controller are calculated by a predetermined procedure from the initialization data and a device number of the channel controller. The calculated address pointer is written into a local memory of the channel controller. Initialization is terminated upon reading an end of initilization data.

2 Claims, 5 Drawing Sheets

| THE FIRST WORD 31 | BASE ADDRESS (A) | |
|---|---|---|
| THE SECOND WORD 32 | SIZE (d) | OFFSET (e) |

SYSTEM FOR INITIALIZATION OF CHANNEL CONTROLLERS UTILIZING ADDRESS POINTERS CALCULATED FROM MULTIPLYING SIZES OF DATA FIELDS WITH DEVICE NUMBERS

This application is a continuation of application Ser. No. 07/099,719, filed Sept. 22, 1987 abandoned.

BACKGROUND OF THE INVENTION

The present invention relates to an initialization method for a channel controller and, more specifically, to an initialization method for a channel controller wherein addresses of the various control data areas in the main memory used by the channel controller are written into the local memory in the channel controller itself upon initialization.

Since a channel controller works using plural control data areas in the main memory, the address of each of the areas is required to be written into the local memory of said channel controller. The prior art initialization technique to satisfy this requirement is found in the British Pat. No. 1,548,497, in which the method for initializing the firmware module of a data processing device is shown.

Furthermore, the prior art method for address generation is disclosed in the U.S. Pat. No. 3,839,706, in which the means for translating the virtual command address of a channel program to a real memory address is shown for computer employing a virtual memory and/or paging system.

It seems that the above requirement can be satisfied by combining the forementioned initialization and address generation methods. However, due to the fundamental properties of a virtual memory and/or paging system, the combination causes address translation complications, with the result that the time taken for initialization is prolonged. Also, there is another drawback in that the number of the steps of the microprogram and the necessary hardware increases. On the other hand, since the memory capacity required for the control data area is generally small, the address setting by way of a virtual memory and/or paging system is hardly necessary.

SUMMARY OF THE INVENTION

An object of the present invention is, therefore, to provide an initialization method for a channel controller which is free from the above-mentioned drawbacks.

According to one aspect of the invention, there is provided a method for initializing a set of the channel controllers in an information processing system, in which the address pointers of plural control data areas, each area being associated with one of said channel controllers, are written into the local memories of each of said channel controllers. The method of the invention includes:

a step for storing in advance into the main memory of said information processing system the initialization data composed of the base addresses of control data areas, the sizes of data fields of said control data areas, the offsets of data fields of said control data areas from said base addresses, and the data indicating the end of the initialization;

a step for each of said channel controllers to sequentially read said initialization data in said main memory;

an arithmetic operation step for calculating the address pointers assigned to said channel controller in accordance with the predetermined procedure from said initialization data read by said step and the device number of said channel controller;

a step for writing the address pointers assigned to said channel controller based on the result of said arithmetic operation into said local memory of said channel controller;

and a step for terminating the initialization of said channel controller upon reading said data indicating the end of the initialization in said sequentially reading step.

BRIEF DESCRIPTION OF THE DRAWINGS

The features and advantages of the present invention will be apparent from the following detailed description of a preferred embodiment of the invention as illustrated in the accompanying drawings wherein:

In FIGS. 1 to 6, the same reference numerals denote the same structural elements, respectively.

DETAILED DESCRIPTION OF THE PREFERRED EMBODIMENT

An embodiment of the present invention will now be described in detail with reference to the accompanying drawings.

Figure 1:
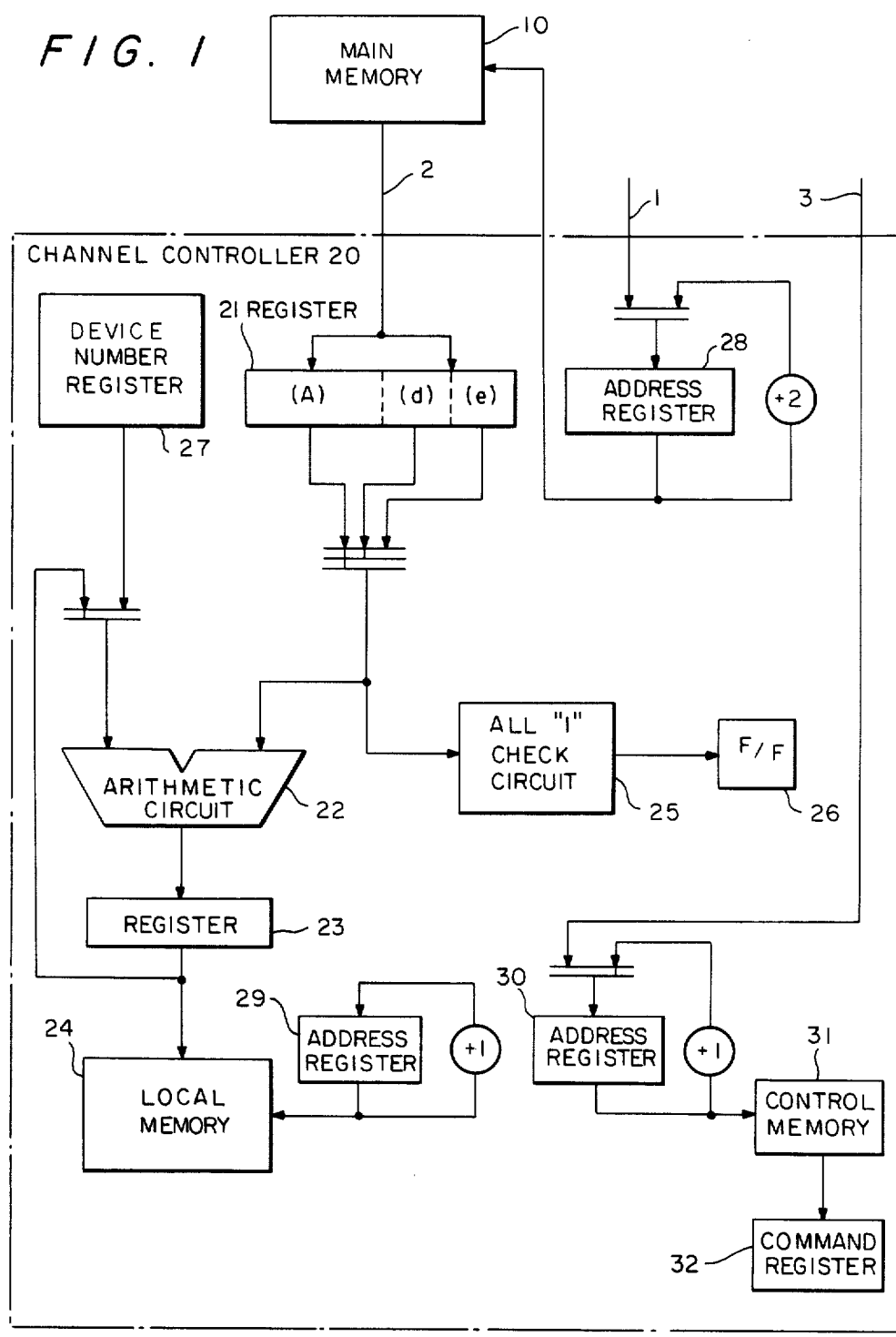
FIG. 1 shows an example of an information processing system to embody the present invention.

Referring to FIG. 1, an embodiment of the present invention includes a main memory 10 and a channel controller 20 connected to the main memory 10. The channel controller 20 comprises a register 21 for storing the initialization data of two words read via line 2 from the main memory 10, a device number register 27 which holds the device number of the channel controller 20, an arithmetic circuit 22 for calculating the address pointers of the control data area assigned to the channel controller 20 in the main memory 10 resorting to the arithmetic operation on the data from the register 21 and the device number from the device number register 27, and a register 23 for holding the result of the arithmetic circuit 22. The channel controller further includes a local memory 24 for storing the address pointers sent from the register 23, an address register 29 for determining the store address of the address pointers which are designate to the local memory 24, all '1' check circuit 25 for detecting all '1' data indicating the end of the initialization among the data stored in the register 21, a flip-flop (F/F) 26 set in response to the output of the all '1' check circuit 25, an address register 28 for storing the address of the initialization data in the main memory 10, the initial value of it being set by the data given via line 1 and updated by two for each repetition. Also included therein are a control memory 31 for storing the microprogram to control the initialization of the channel controller 20, an address register 30, initialized in response to the start signal given via line 3, for determining the read address from the control memory 31, and a command register 32 for storing the microprogram read from the control memory 31.

Figure 2:
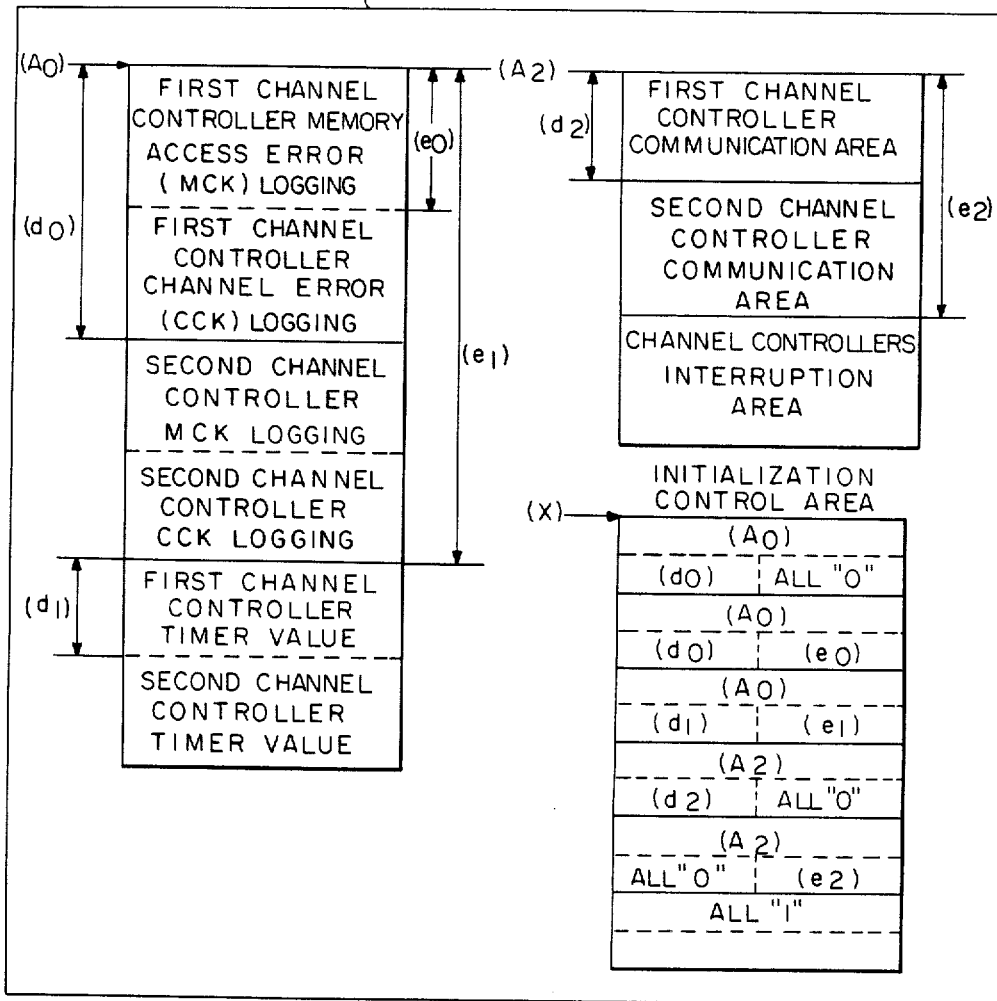
FIG. 2 shows contents of the main memory and local memory in FIG. 1.
Figure 2:
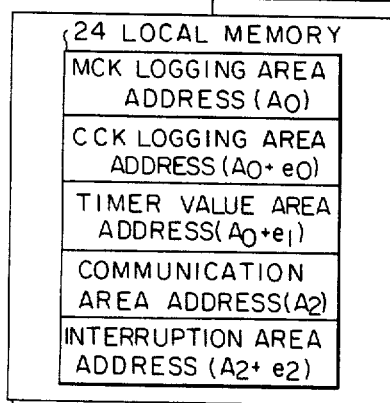
Figure 2:
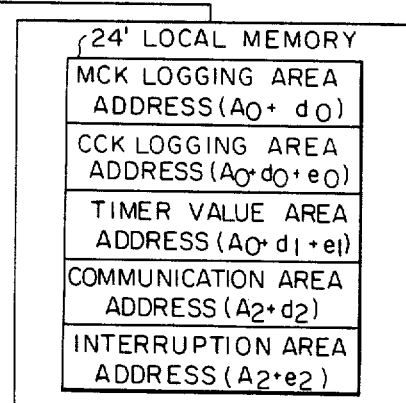

Now, referring to FIG. 2, the main memory 10 contains five control areas, two of which are the log areas, a memory access error flag area (described as MCK log area in the following) and a channel error log area (described as CCK log area in the following). The other three are a timer-value area, a communication area and an interruption area, respectively. The MCK and CCK log areas constitute a log area of size (d0). The log area of the channel controller 20 begins at a base address (A0), while that of the second channel controller 20' begins at (A0+d0). In the same way, the log area of the following channel controller (not shown) is determined using the displacement (d0) from the starting address of the preceding channel controller. The MCK and CCK log areas are separated by the offset (e0) from the start address of the log area. The timer-value area of size (d1) begins at an address (A0+e1) adjacent to the log areas for the first channel controller 20. The communication area of size (d2) for the first channel controller 20 begins at a base address (A2), and those for other controllers follow it. Adjacent to the communication area, the interruption area is assigned to an address (A2+e2), which is common to all the channel controllers.

Figures 3, 4:
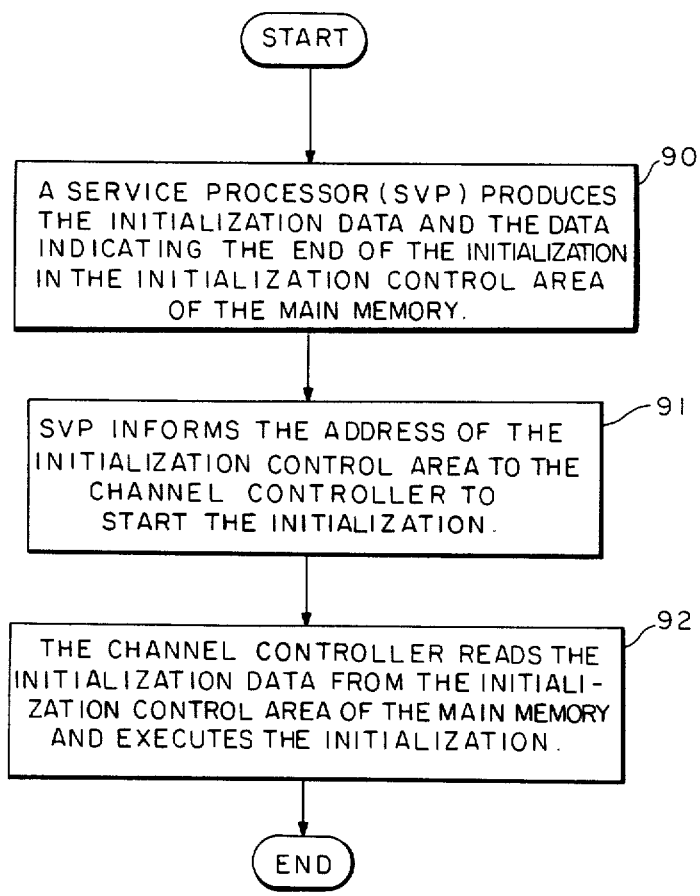
FIG. 3 shows the format of the initialization data used for initialization of the channel controller.
FIG. 4 is a flow diagram of the initialization of the channel controller according to the present invention.

On the other hand the initialization data, the format of which is shown in FIG. 3, is in advance provided in the initialization control area of the main memory 10, which is used for writing the address pointers to the above plural control areas into the local memory of the first channel controller 20 or the second channel controller 20'.

Referring to FIG. 3, the initialization data is composed of two words. The first word 31 is the base address field (A) in the main memory, at which the control areas begins. The size field (d) in the second word indicates the size of the control area. The offset field (e) in the second word 32 gives the distance between the start address of the control area and the base address.

Now, referring to FIG. 4, which shows briefly the initialization process of the channel controller according to the present invention, the initialization process initiates the procedure shown in a box 90. Namely, a service processor (SVP) (not shown) stores the initialization control data into the initialization control area beginning at an address (x) of the main memory 10. Then, the SVP performs the procedure shown in a box 91 in FIG. 4, in which the SVP applies the base address (x) of the initialization control area in the main memory 10 to the line 1 and gives the start signal via line 3 to the address register 30 of the channel controller 20.

Next, the channel controller initiates the procedure shown in a box 92 in FIG. 4 in response to the start signal. The detail of the procedure of the box 92 will be explained referring to FIGS. 5 and 6 in the following, which show the detail of the initialization process and the address generation procedure for the control area of the channel controller, respectively. In response to the start signal, the channel controller 20 sets the value of the address register 30 to zero: reads from the address pointed by the content of the address register 30 the microprogram for processing the procedure shown in a box 101 in FIG. 5; stores it to the command register 32; writes the address (x) to the address register 28; clears the address register 29; and resets the F/F 26.

Figure 5:
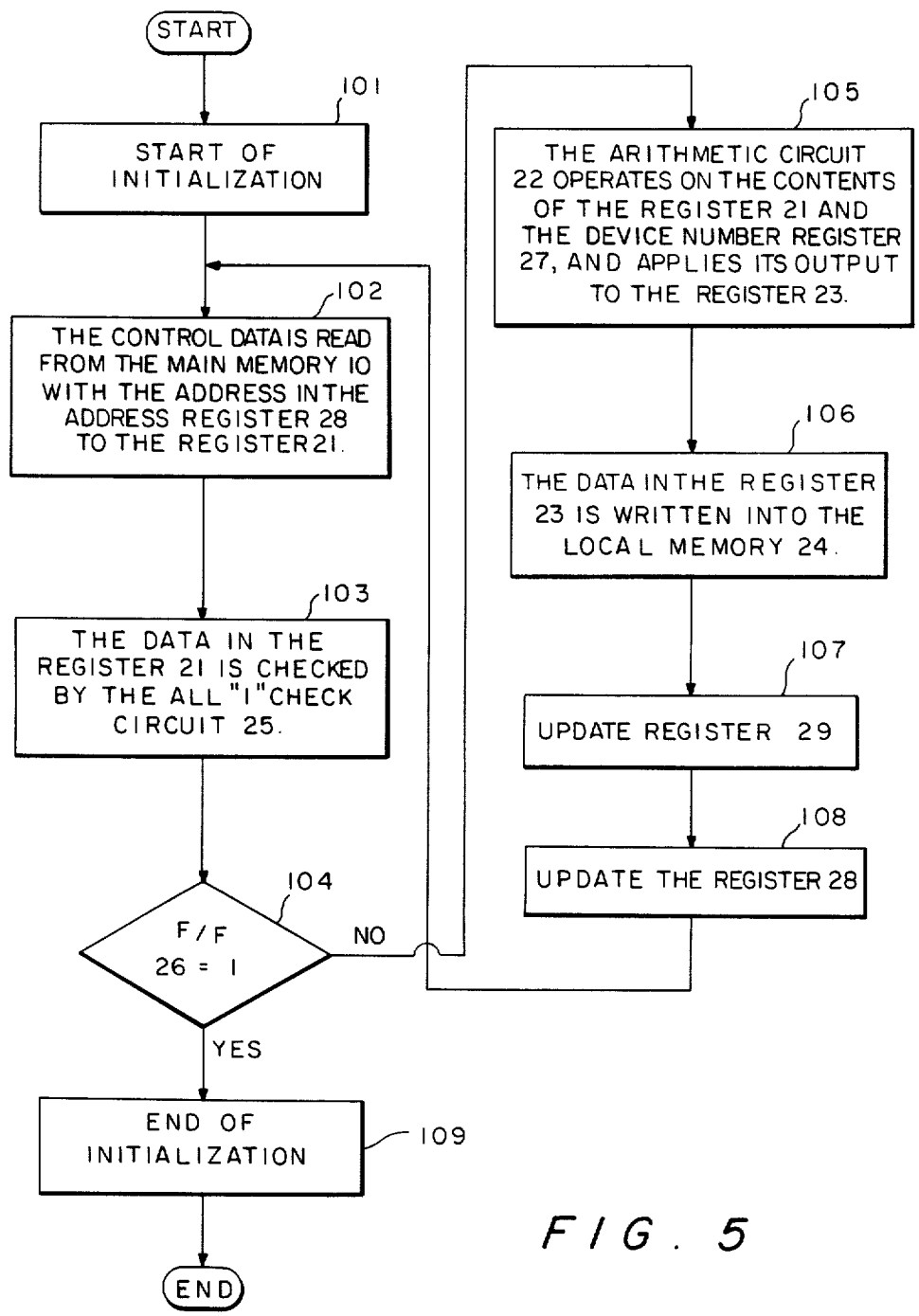
FIG. 5 shows the detail of the initialization process given in a box 92 of FIG. 4.

Next, the channel controller 20 updates the address register 30: reads the microprogram for processing the procedure shown in a box 102 in FIG. 5; stores it to the command register 32; reads two words stored at the address (x) in the main memory 10, which are the base address (A0) of the MCK log area and (d0, 0); and sets the first word (A0) to the field A of the register 21, and (d0) and (0) to the fields d and e of the register 21, respectively. Then, the channel controller 20 updates the address register 30: reads the microprogram for processing the procedure shown in box 103 in FIG. 5; stores it to the command register 32; and then applies the data (A0) in the field A of the register 21 to all '1' check circuit 25 to check whether it is the data indicating the end of the initialization or not. Since it is not all '1' data, the output of the all '1' check circuit 25 does not set the F/F 26.

Furthermore, the channel controller 20 updates the address register 30: reads the microprogram for processing the procedure shown in box 104 in FIG. 5; stores it to the command register 32; and checks whether the output of the F/F 26 is '1' or not. Since it is zero, the channel controller 20 updates the register 30; reads the microprogram for processing the procedure shown in box 105 in FIG. 5; stores it to the command register 32; and determines the MCK log area address by performing the operation shown in FIG. 6.

Figure 6:
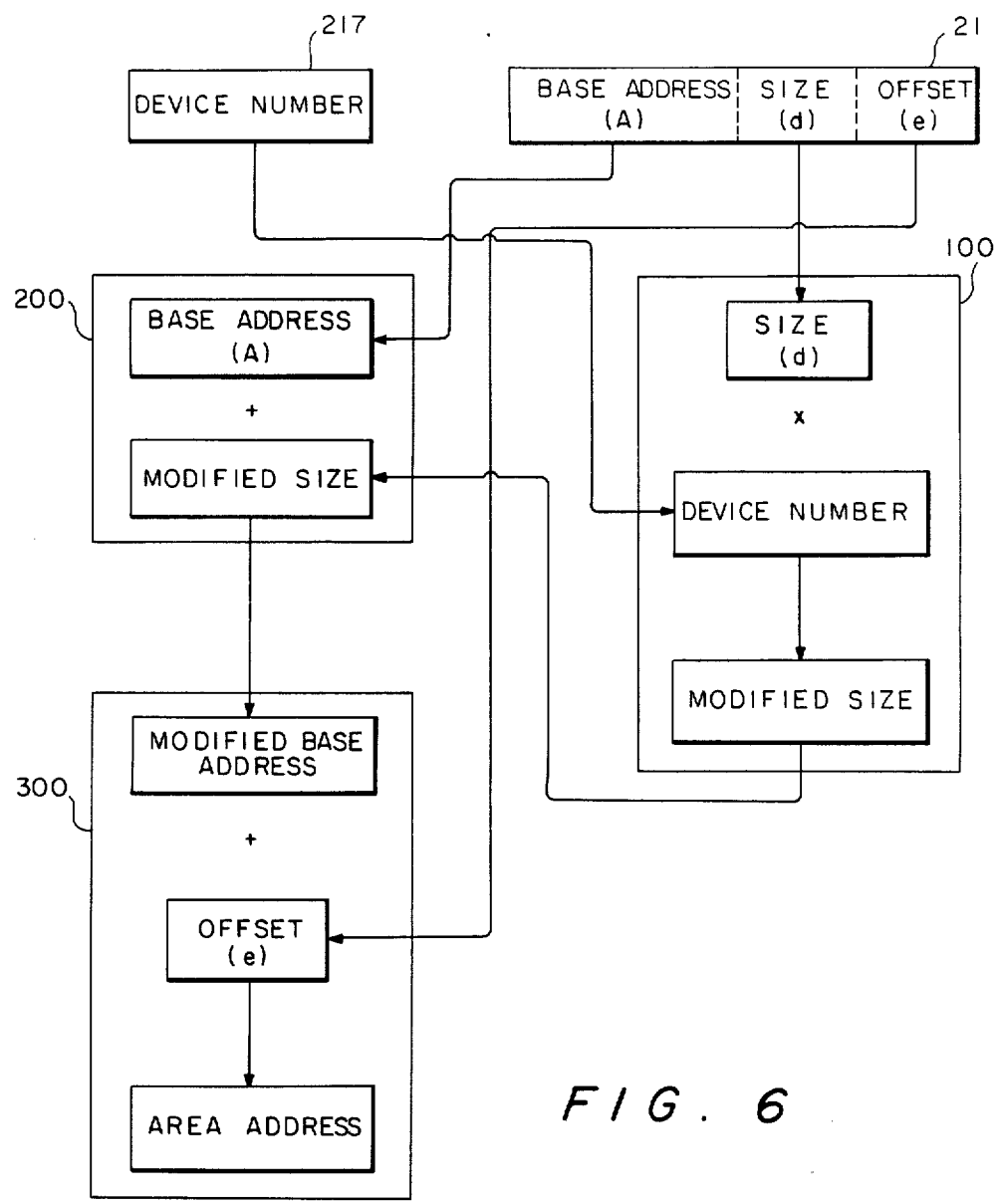
FIG. 6 shows the address generation procedure for the control data area assigned to the channel controller.

Referring to FIG. 6, the channel controller 20 inputs the size data (d0) in field d of the register 21 and the device number stored in the device number register 27 to the arithmetic circuit: 22 which multiplies the two numbers. This is shown in Box 100 of FIG. 6 which represents the arithmetic function of circuit 22. The output of the circuit: 22 is the modified size, which is written into the register 23. Thus, the modified size for the first channel controller 20 is zero, while it is (d0) for the second controller 20'. Then, the channel controller 20 inputs the base address (A0) of the field A of the register 21 and the modified size in register 23 to the arithmetic circuit 22 to add to each other, noted in box 200. The output of the circuit 22 is the modified base address, which is written into the register 23. The modified base address for the first channel controller 20 is (A0), while it is (A0+d0) for the second controller 20'. Furthermore, the channel controller 20 inputs the offset data (0) and the modified base address in the register 23 to the arithmetic circuit 22 to add to each other, noted in box 300. The output of the circuit 22 is the address pointer to the MCK log area, which is written into the register 23. Thus, this address pointer is (A0) for the first channel controller 20 and (A0+d0) for the second channel controller 20'.

Next, the channel controller 20 updates the address register 30: reads the microprogram for processing the procedure shown in a box 106 in FIG. 5; stores it to the command register 32; and then wires the address pointer to the MCK log area into the location in the local memory designated by the address register 29.

Then, the channel controller 20 updates the address register 30: reads the microprogram for processing the procedure shown in a box 107 in FIG. 5; stores it to the command register 3;; and then updates the address register 29. In succession, it updates the address register 30: reads the microprogram for processing the procedure shown in a box 108 in FIG. 5; stores it to the command register 32; increments the address register 28 by two word addresses; and then sets the address register 30 to the microprogram address for processing the procedure shown in the box 102 in FIG. 5.

Again the channel controller 20 reads the microprogram corresponding to the box 102 to the command register 32, by which the initialization data for the CCK area, that is, (A0) and (d0, e0), is read from the main memory 10 to the register 21. Similarly, after the procedures from boxes 103 to 108 are processed, the address pointer to the CCK log area is stored to the local memory 24, and the address register 30 is again updated to the address of the microprogram for the box 102. The modified size, calculated as is shown in FIG. 6, is this time (0) for the first channel controller 20 and (d0) for the second channel controller 20', while the modified base address is (A0) for the first channel controller 20 and (A0+d0) for the second channel controller 20'. The address pointer for the CCK log area is (A0+e0) for the first channel controller 20 and (A0+d0+e0) for the second channel controller 20'.

In the same way, the address pointers for the timer value area, communication area and interruption area are written into the local memory 24 by repeating the procedure from boxes 102 to 108. Since the initialization data for timer value area is (A0) and (d1, e1), the modified size is (0) for the first channel controller 20 and (d1) for the second channel controller 20'. The modified base address is (A0) for the first channel controller 20 and (A0+d1) for the second channel controller 20'. Therefore, the address pointer to the timer value area is (A0+e1) for the first channel controller 20 and (A0+e1+d1) for the second channel controller 20'. Since the initialization data for the communication area is (A2) and (d2, 0), the modified size is (0) for the first channel controller 20 and (d2) for the second channel controller 20', with the result that the modified base address is (A2) for the first channel controller 20 and (A2+d2) for the second channel controller 20'. Thus, the address pointer to the communication area is (A2) for the first channel controller 20 and (A2+d2) for the second channel controller 20'. The initialization data for the interruption area is (A2) and (0, e2). Since the size data is (0), the modified size is also (0). Consequently, the modified base address is (A2) both for the first and the second channel controller 20 and 20', with the result that the address pointer to the interruption area is (A2+e2) independent of the device number.

Again, upon executing the procedure of the box 102 the two word data, of which the first word is all '1', is read from the main memory 10. When the procedure of the box 103 is executed, the output of the all '1' check circuit 25 sets the flip-flop 26 to detect the terminating condition in the box 104 in FIG. 5. Then, the microprogram for processing the procedure shown in a box 109 in FIG. 5 is read out to the command register 32 so that the heading address of the microprogram for controlling the normal operation is set to the address register 30. It means that the initialization process ends.

As is described above, the present invention has the advantages that the initialization data stored in advance in the main memory is common to each channel controller, and that the necessary hardware is resultantly small. For, the address pointer to the particular area assigned to a channel controller can be determined only from the initialization data read from the main memory common to all controllers and from the device number of the channel controller. Also, it is not necessary for the channel controller to know in advance the modified value proper to the control area and the order of the setting of the address pointers. Moreover, since the initialization process terminates upon encountering the predetermined bit pattern, the number of the address pointers to be set is not necessary to be know in advance, with the result that the initialization process is very simple.

The present invention has the further advantage that the area assigned to a channel controller can be changed upon the initialization process of the channel controller without any additional mechanism.

What is claimed is:

1. A method for initializing a set of channel controllers in an information processing system by writing address pointers of a particular one of a plurality of control data areas assigned to one of the channel controllers into a respective local memory of each of said channel controllers, the method including steps of:
   i. storing in a main memory of said information processing system initialization data which is composed of base addresses of control data areas, sizes of data fields of said control data areas, offsets of data fields of said control data areas from said base addresses, and data indicating end of initialization;
   ii. each of said channel controllers sequentially reading said initialization data stored in said main memory;
   iii. calculating the address pointers assigned to one of the channel controllers by utilizing a predetermined procedure from said initialization data read by said one of the channel controllers and a device number relating to said one of the channel controllers, said predetermined procedure including multiplying said sizes of data fields of said control data areas by said device number;
   iv. writing the address pointers assigned to said one of the channel controllers, based on a result of said calculating step, into said local memory of said one of the channel controllers;
   v. accessing said main memory by utilizing the address pointers written into said local memory; and
   vi. terminating the initialization of said one of the channel controllers upon reading said data indicating the end of the initialization in said sequential reading step.

2. A system for initializing a set of channel controllers in an information processing system by writing address pointers of a particular one of the plurality of control data areas assigned to one of the channel controllers into a respective local memory of each of said channel controllers, the system including:
   storing means for storing in a main memory of said information processing system initialization data which is composed of base addresses of control data areas, sizes of data fields of said control data areas, offsets of data fields of said control data areas from said base addresses, and data indicating end of initialization;
   reading means provided in each of said channel controllers and connected to said main memory for sequentially reading said initialization data stored in said main memory;
   calculating means connected to said reading means for calculating the address pointers assigned to one of the channel controllers by utilizing a predetermined procedure from said initialization data read by said one of the channel controllers and a device number relating to said one of the channel controllers, said predetermined procedure including multiplying said sizes of data fields of said control data areas by said device number;
   writing means connected to said calculating means for writing the address pointers assigned to said one of the channel controllers, based on a result of said calculating, into said local memory of said one of the channel controllers;

accessing means connected to said main memory for accessing said main memory by utilizing the address pointers written into said local memory; and means for terminating the initialization of said one of the channel controllers upon reading said data indicating the end of the initialization in said sequential reading of said reading means.

* * * * *